United States Patent
Maruyama

(10) Patent No.: US 9,307,218 B2
(45) Date of Patent: Apr. 5, 2016

(54) IMAGING APPARATUS HAVING FOCAL CORRECTION, AND CONTROL METHOD FOR THE SAME

(71) Applicant: CANON KABUSHIKI KAISHA, Tokyo (JP)

(72) Inventor: Naoki Maruyama, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/750,575

(22) Filed: Jan. 25, 2013

(65) Prior Publication Data

US 2013/0194485 A1    Aug. 1, 2013

(30) Foreign Application Priority Data

Jan. 31, 2012    (JP) .................... 2012-018535

(51) Int. Cl.
*H04N 9/79* (2006.01)
*H04N 5/232* (2006.01)
*H04N 5/77* (2006.01)

(52) U.S. Cl.
CPC ......... *H04N 9/7908* (2013.01); *H04N 5/23212* (2013.01); *H04N 5/772* (2013.01)

(58) Field of Classification Search
CPC .. H04N 9/7908; H04N 5/23212; H04N 5/772
USPC .............. 348/222.1, 241, 345, 347, 349
See application file for complete search history.

(56) References Cited

U.S. PATENT DOCUMENTS

| | | | |
|---|---|---|---|
| 6,839,084 B1 * | 1/2005 | Hiyama et al. | 348/241 |
| 7,414,231 B2 | 8/2008 | Fukui | |
| 2005/0141117 A1 * | 6/2005 | Kim et al. | 359/892 |
| 2008/0225405 A1 * | 9/2008 | Kuroda et al. | 359/687 |
| 2010/0026875 A1 * | 2/2010 | Shirai | 348/335 |
| 2012/0044369 A1 * | 2/2012 | Irisawa et al. | 348/208.4 |
| 2012/0050580 A1 * | 3/2012 | Iwasaki | 348/241 |
| 2012/0081583 A1 * | 4/2012 | Kikuchi et al. | 348/242 |
| 2012/0293707 A1 * | 11/2012 | Nagano | 348/345 |

FOREIGN PATENT DOCUMENTS

| | | |
|---|---|---|
| JP | 01-128688 | 5/1989 |
| JP | 08-289191 | 11/1996 |
| JP | 2006-098771 A | 4/2006 |
| JP | 2006-293035 A | 10/2006 |
| JP | 2011-007882 A | 1/2011 |
| JP | 2012-003128 A | 1/2012 |

OTHER PUBLICATIONS

The above foreign patent documents were cited in the Oct. 20, 2015 Japanese Office Action, that issued in Japanese Patent Application No. 2012018535.

* cited by examiner

*Primary Examiner* — Gevell Selby
(74) *Attorney, Agent, or Firm* — Cowan, Liebowitz & Latman, P.C.

(57) ABSTRACT

An imaging apparatus includes an autofocus function, and performs focus adjustment by displacing a focus lens to an in-focus opposition. A focal correction calculation unit calculates a focal correction amount using at least one type of information selected from the diaphragm information used for exposure adjustment, positional information for the zoom lens, and positional information for the focus lens. The focal correction amount is further revised, and processing is executed to suppress coloring on the subject image resulting from chromatic aberration. The correction amount after revision is sent to a focal adjustment unit and the focal lens is driven and controlled by the lens control unit.

16 Claims, 6 Drawing Sheets

IMAGING APPARATUS HAVING FOCAL CORRECTION, AND CONTROL METHOD FOR THE SAME

BACKGROUND OF THE INVENTION

1. Field of the Invention

The present invention relates to focus adjustment control of an imaging apparatus.

2. Description of the Related Art

An imaging apparatus is known to include an autofocus (hereinafter denoted as AF) function in which focusing is automatically performed relative to a subject. For example, there is a method in which an AF evaluation value is obtained by use of a band pass filter by extracting high frequency components from imaging data acquired by an imaging element through a lens, and the focus lens is moved to a peak position of the maximum AF evaluation value. The focus lens position at which the AF evaluation value is a maximum is the so-called just focus position. A method of aligning the focus lens to that position includes a calculation method or the like based on a variation amount or inclination amount in the AF evaluation value, or the increase of the AF evaluation value.

On the other hand, the effect of chromatic aberration on a lens, that is to say, the effect due to different focal distances resulting from the wavelength has been indicated in relation to an imaging apparatus. For example, when imaging by use of three primary colors of R (red), G (green) and B (blue), when focusing is performed by alignment with the G component, an image will result that is tinged with red on the edge portions of the subject. When a color appears on the edge portions of the subject as a result of chromatic aberration where that color was not originally present, a reduction in quality will result. Furthermore chromatic aberration causes a divergence in the focal position due to AF. This is due to the difference between the appearance to the human eye from the alignment of the focal position resulting from contrast.

In an imaging apparatus exhibiting chromatic aberration in the lens, the focal position aligned with the G component for example in an image that exhibits chromatic aberration appears to the human eye to be at the just focus position. On the other hand, when using a method in which an AF evaluation value is generated by use of contrast in the subject (color contrast) (that is to say, a contrast AF), the contrast difference in the subject image is greatest at the focus lens position at which the focus lacks sharpness and chromatic aberration is not present. Therefore, when there is an erroneous determination that this position is the just focus position, the captured image will be a blurred image. As a result, various methods have been proposed to avoid generation of blurring due to a chromatic aberration. The apparatus disclosed in Japanese Patent Laid-Open No. 8-289191 looks up a table stored in a memory when the zoom amount is varied as a result of displacement of the zoom lens, to thereby read out a focus lens position for each color corresponding to the zoom amount. The height varying unit of the respective imaging elements is driven independently in accordance with the read-out focus lens position so that the focus is corrected. The correction of blurring of focus is based on a reference table that contains an aberration correction amount respectively for RGB corresponding to the zoom lens position. Japanese Patent Laid-Open No. 1-128688 discloses another method of calculating a correction amount for any one of RGB and correcting the position of another imaging element in response to the calculation result.

The conventional techniques disclosed in Japanese Patent Laid-Open No. 8-289191 and Japanese Patent Laid-Open No. 1-128688 enable control to stop the AF operation at the just focus position by correction of the deviation of the focal position resulting from chromatic aberration. However, although focused state is enabled as a result, when coloring occurs on the edge portions of the subject image due to the effect of chromatic aberration, there is the possibility of an adverse effect on image quality.

SUMMARY OF THE INVENTION

The imaging apparatus according to the present invention corrects a focal deviation resulting from a chromatic aberration in the lens and suppresses coloring of the edge portions of the subject image resulting from chromatic aberration.

The imaging apparatus according to the present invention includes an optical imaging system that has a moveable lens for focus adjustment and a moveable lens for adjustment of angle of view, and executes focus adjustment by displacement of the moveable lens for focus adjustment to an in-focus position. The imaging apparatus includes an imaging element configured to perform photoelectric conversion upon reception of light from the subject, a control unit configured to control driving of the moveable lens for focus adjustment by detection of the in-focus position, and a correcting unit configured to acquire positional information for the moveable lens for focus adjustment or the positional information for the moveable lens for adjustment of angle of view and calculate a correction amount configured to correct a deviation in the in-focus position resulting from chromatic aberration in the optical imaging system, in addition to perform processing to suppress coloring of the subject image resulting from chromatic aberration by revising the correction amount to thereby output a revised correction amount to the control unit.

The present invention suppresses coloring of the edge portions of the subject image and prevents a focal deviation resulting from chromatic aberration to thereby suppress a reduction in image quality.

Further features of the present invention will become apparent from the following description of exemplary embodiments with reference to the attached drawings.

DESCRIPTION OF THE EMBODIMENTS

The embodiments of the present invention will be described in detail below making reference to the attached figures.

First Embodiment

Figure 1:
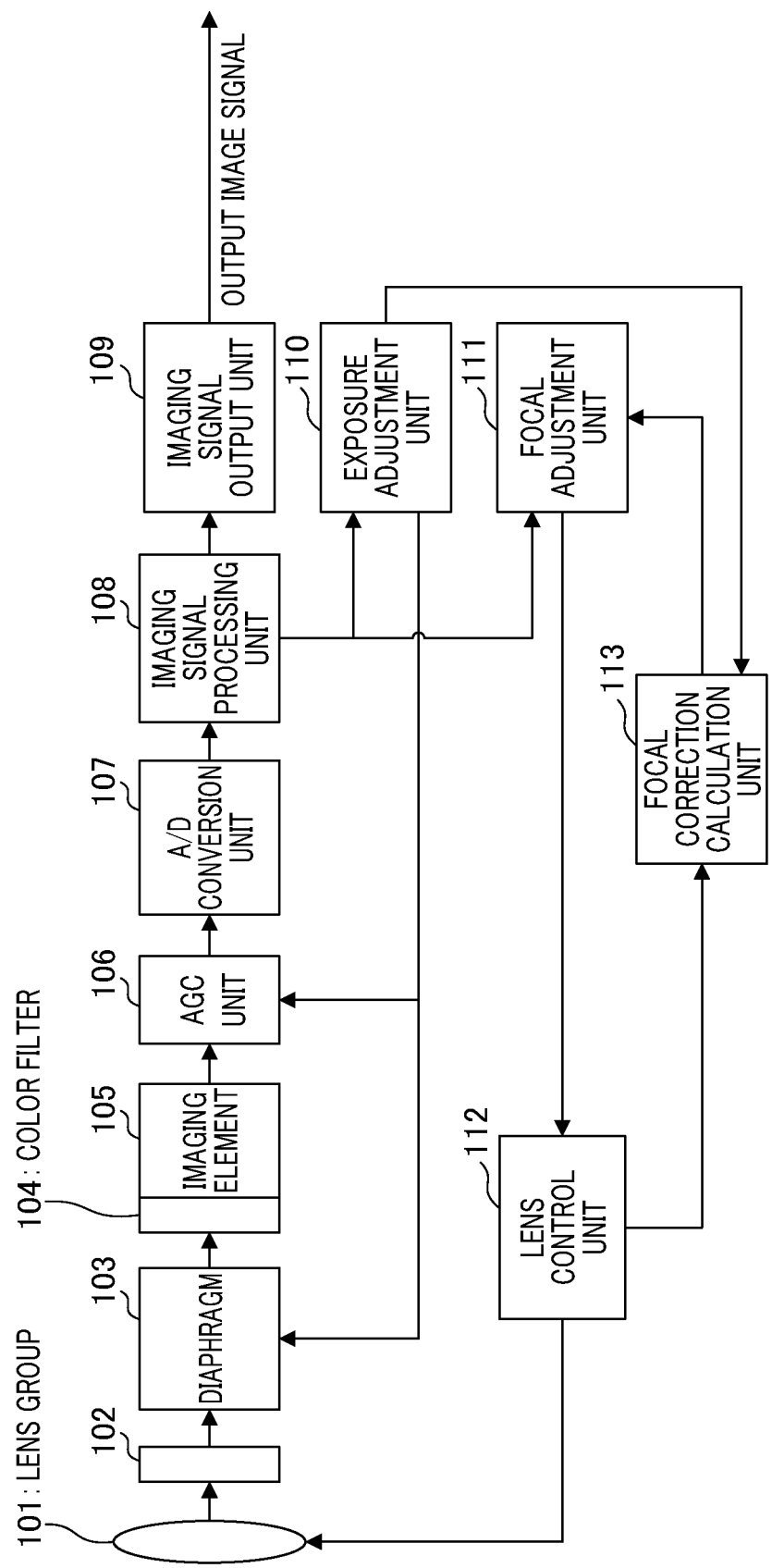
FIG. 1 is a block diagram illustrating a configuration example of an imaging apparatus according to a first embodiment.

FIG. 1 is a block diagram illustrating a basic configuration example of an imaging apparatus according to a first embodiment of the present invention. A lens group 101 configures an optical imaging system that concentrates incident light from a subject onto an imaging element 105. The lens group 101 includes a fixed lens, a moveable lens for focus adjustment, and a moveable lens for adjusting the captured angle of view. The moveable lens for performing focus adjustment in relation to the subject is termed the focus lens. The focus lens position during focus adjustment control corresponds to the position of the focus lens on the optical axis. The moveable lens for adjusting the captured angle of view is termed the zoom lens. The zoom lens position during magnification control of the optical imaging system corresponds to the position of the zoom lens on the optical axis. The light that is incident in the imaging apparatus through the lens group 101 passes through an optical filter 102 and adjustment of the light amount is performed by a diaphragm 103. The diaphragm 103 adjusts the light amount passing to the imaging element 105, and the light after adjustment passes through a color filter 104 so as to be received by the imaging element 105. The color filter 104 is disposed in a predetermined sequence for each pixel on the light receiving surface of the imaging element 105. The imaging element 105 receives light from the subject, and captured imaging information is output as an analog signal.

The output signal after photoelectric conversion corresponding to the subject image that is formed by the imaging element 105 is sent to an automatic gain controller (hereinafter referred to as "AGC") portion 106, and then the luminance adjustment is performed. An A (analog)/D (digital) conversion unit 107 converts the analog image signal output from the AGC unit 106 to a digital signal. An image signal processing unit 108 executes predetermined processing on the digital image signal from the A/D conversion unit 107 and outputs the luminance signal and the color signal for each pixel. The image signal processing unit 108 generates an image signal to be output and prepares various types of parameters for camera control. The parameters are used for diaphragm control, focus adjustment control, white balance control for adjusting tinting, and the like. An image signal output unit 109 outputs an image signal generated by the image signal processing unit 108 to an external apparatus.

An exposure adjustment unit 110 calculates luminance information in the captured image based on the luminance information output from the image signal processing unit 108, and controls the AGC unit 106 and the diaphragm 103 to adjust the captured image to a desired brightness. In addition, although not illustrated, the exposure adjustment unit 110 performs control to adjust the brightness by adjusting the shutter speed.

A focal adjustment unit 111 performs focus adjustment control through a lens control unit 112. During normal focusing operations, an AF evaluation value is calculated by the focal adjustment unit 111 as focus adjustment information for focusing by extracting the high frequency components from the image signal generated by the image signal processing unit 108. The focal adjustment unit 111 performs positional setting of the focus lens and performs driving control of the lens group 101 with the lens control unit 112 in order to maximize the AF evaluation value.

A focal correction calculation unit 113 corrects the focal position as described below in order to prevent focal deviation resulting from chromatic aberration in the lens. Firstly, the focal correction calculation unit 113 calculates a focal correction amount using at least one type of information selected from the diaphragm information used for exposure adjustment, information for the zoom lens from the lens control unit 112, and focus lens information. The focal correction amount is the amount for correcting the positional deviation of the focus resulting from chromatic aberration, that is to say, the correction amount for guiding the focus lens to the in-focus position. The focal correction amount used at this time is retained by the focal correction calculation unit 113 in advance as a reference table for focal correction amounts, and the reference table is used to obtain the focal correction amount based on the diaphragm value and positional information for the zoom lens and the focus lens.

In the present embodiment, a revision process is performed on the obtained focal correction amount. The purpose of the revision is to suppress coloring of the image as a result of a chromatic aberration, and is performed by a slight variation of the position in relation to the correction amount for the in-focus position. It is preferred that the revision amount is within the focal depth during the revision process on the focal correction amount. For example, the revision amount is calculated by use of a calculation formula based on information such as the position of the zoom lens, the position of the focus lens or the diaphragm 103, or may be obtained by use of a reference table. The revision with respect to the focal correction amount suppresses the chromatic aberration on the edge portion of the subject image that becomes prominent as a result correcting the focus lens position to the just focus position.

The focal correction calculation unit 113 sends the correction amount after focal correction and focal revision to suppress chromatic aberration to the focal adjustment unit 111. The focal adjustment unit 111 sets the position of the focus lens, and controls the lens group 101 through the lens control unit 112. In this manner, the image signal for camera control is output to the display control unit or an external apparatus (not illustrated) from the image signal output unit 109.

Next, focal correction according to the present embodiment will be described in detail making reference to the flowchart in FIG. 2. Firstly, after performance of the AF operation on the subject by the focal adjustment unit 111 (refer to S201), the in-focus position is determined. The in-focus determination determines that the focus lens position at which the AF evaluation value is a maximum is the in-focus position (refer to S202). In this manner, the processing proceeds to S203. When the focus lens position at the present time is determined not to be the in-focus position, the processing returns to S201, and the search for the in-focus position is repeated.

When the in-focus position is determined, the focal adjustment unit 111 calculates the focal correction amount using at least one type of information selected from the focus lens position, the zoom lens position or the diaphragm value at that time (refer to S203). The focal correction amount is the correction amount for correction of a focal deviation resulting from a chromatic aberration in the lens, that is to say, it is the correction amount for guiding the focus lens to the in-focus position. The focal correction amount assumes a configuration in which a correction table for calculation based on the zoom lens position and the focus lens position is prepared in advance. An example of the table is illustrated in Table 1.

TABLE 1

|  | FOCUS (FAR) ←→ FOCUS (NEAR) | |
|---|---|---|
| ZOOM (WIDE) | CORRECTION AMOUNT Fw | CORRECTION AMOUNT Nw |
| ZOOM (TELE) | CORRECTION AMOUNT Ft | CORRECTION AMOUNT Nt |

The correction table illustrated in Table 1 is used to introduce a focal displacement amount for correction based on the zoom lens position and the focus lens position. "(WIDE)" in the table denotes the wide-angle end, and "(TELE)" denotes the telephoto end. "(FAR)" denotes the infinitely distant side, and "(NEAR)" denotes closest distance side. Only the following representative correction amounts are shown in Table 1.

Fw: correction amount in (FAR) and (WIDE)
Ft: correction amount in (FAR) and (TELE)
Nw: correction amount in (NEAR) and (WIDE)
Nt: correction amount in (NEAR) and (TELE)

In order to simplify the description, although an example is illustrated in which the correction amount is calculated from the zoom lens position and the focus lens position, a correction table that includes a diaphragm value may also be used.

Figure 2:
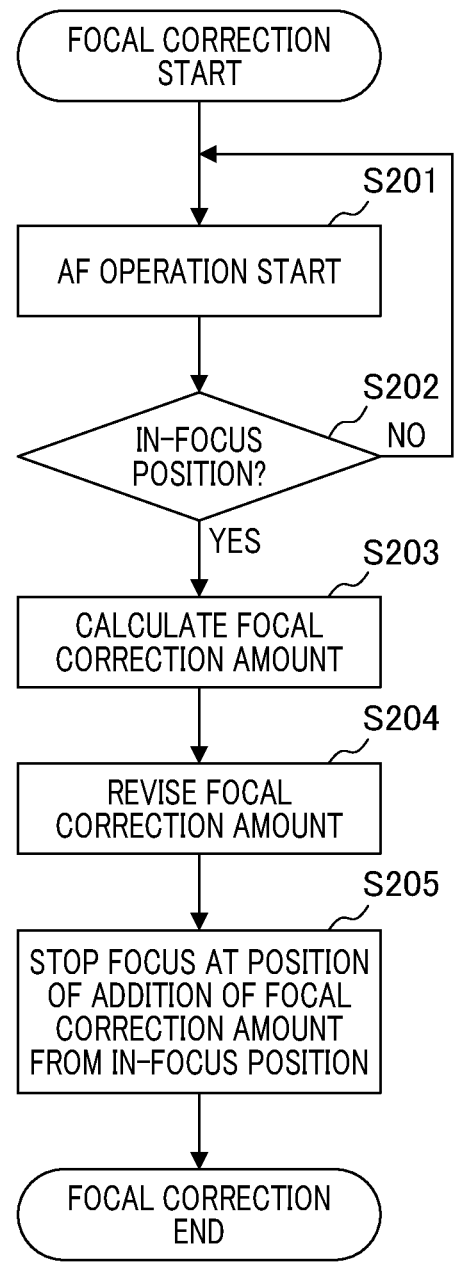
FIG. 2 is a flowchart illustrating a processing example according to the first embodiment.

The focal correction amount calculated in S203 in FIG. 2 is further revised in S204. The revision of the focal correction amount in S204 is preferably configured as a revision within the depth of focus so that the blurring of focus is not evident. For example, the revision amount at this time is calculated using a calculation formula based on information such as the position of the zoom lens, the position of the focus lens or the diaphragm value, or may be obtained by use of a reference table. Alternatively, a method may be used in which a correction table is prepared by addition of a pre-estimated focal revision amount, and a correction amount corresponding to the information such as the position of the zoom lens, the focus lens position or the diaphragm value is obtained.

In this manner, after focal correction and focal revision to suppress chromatic aberration, the focal adjustment unit 111 calculates a drive amount for the focus lens with reference to the focal correction amount and the in-focus position, and sets the position of the focus lens through the lens control unit 112 (refer to S205). The focus lens position is determined by moving the focus lens to a position corresponding to the focal correction amount after revision.

In the first embodiment, focal deviation resulting from chromatic aberration is prevented by the focal correction process described above, and in addition, revision of the focus lens position is performed (for example, revision within the depth of focus). In this manner, coloring of the edge portions of the subject image can be suppressed.

Second Embodiment

Next, with reference to FIG. 3, the imaging apparatus according to a second embodiment of the present invention will be described. Those constituent elements that are the same as the first embodiment illustrated in FIG. 1 are denoted by use of reference numerals configured by addition of 200 to the reference numerals already used, and detailed description of those elements will not be repeated. The principal points of difference will be described below.

Figure 3:
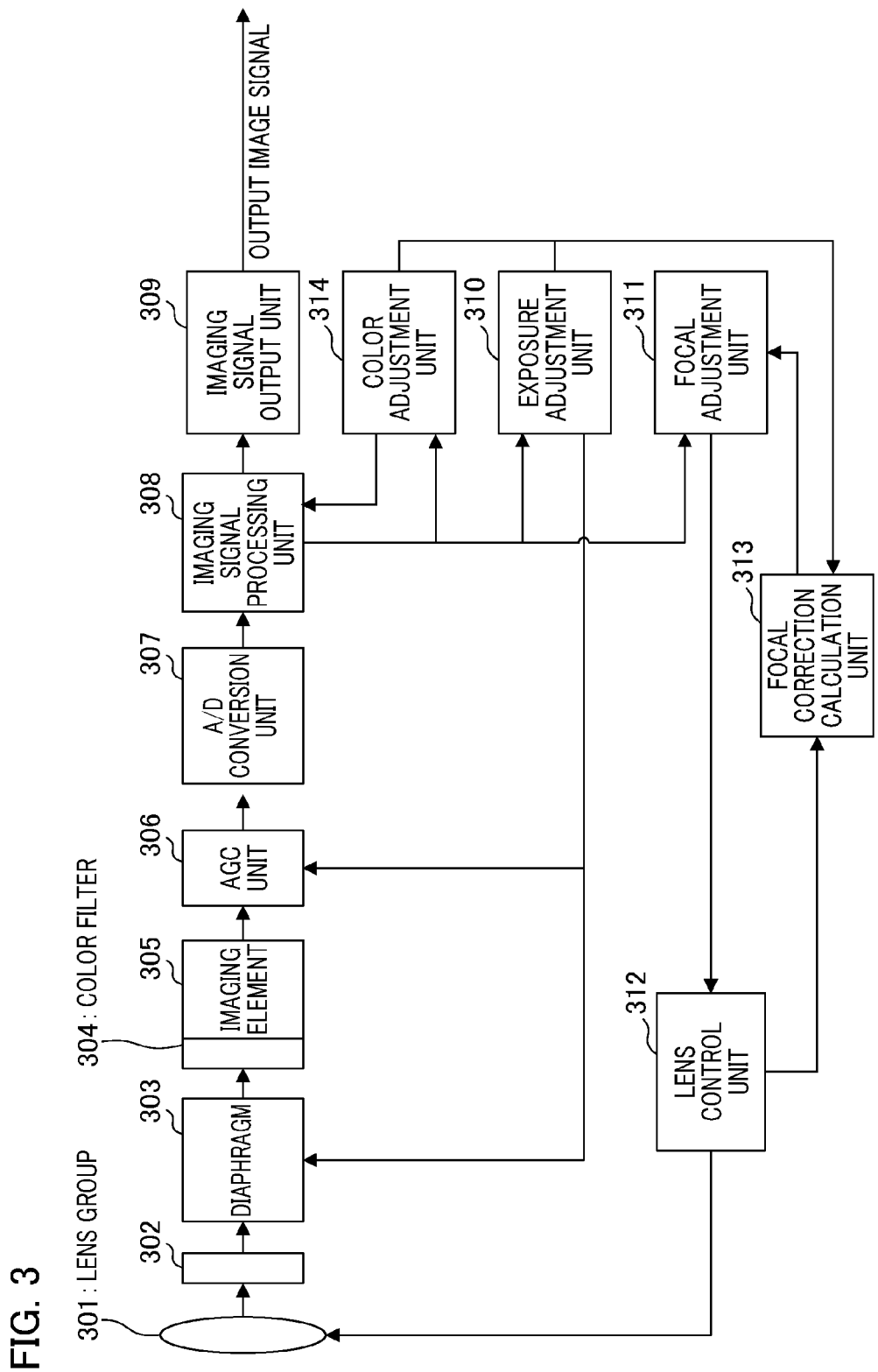
FIG. 3 is a block diagram illustrating a configuration example of an imaging apparatus according to a second embodiment.

The imaging apparatus illustrated in FIG. 3 includes a color adjustment unit 314. The color adjustment unit 314 performs suitable coloring processing by use of a balance between respective colors with respect to a color signal output by the image signal processing unit 308. Furthermore, the image signal processing unit 308 and a color adjustment unit 314 perform decolorization processing as parts of the color adjustment. The decolorization processing is a processing of shifting from a chromatic state to an achromatic state. An example of decolorization processing is processing to switch to an achromatic state when the actual subject color cannot be expressed due to a large change in the gain for each color. The level of the color signal or the color difference signal is reduced to approach an achromatic state. Furthermore, a normal focusing operation extracts high frequency components from an image signal prepared in the image signal processing unit 308 and calculates the value of the high frequency components as focus adjustment information (AF evaluation value). The focal adjustment unit 311 sets the focus lens position and controls the driving of the lens group 301 through the lens control unit 312 in order to maximize the AF evaluation value.

In the present embodiment, the focal position is corrected using the following method in order to prevent focal deviation resulting from a chromatic aberration. Firstly, the focal correction calculation unit 313 calculates the focal correction amount based on at least one type of information of the focus lens position information and zoom lens position information of the lens group 301 controlled by the lens control unit 312, and the diaphragm information used in exposure adjustment. The focal correction amount is a correction amount configured to correct a focal position deviation resulting from chromatic aberration, that is to say, a correction amount that guides the focus lens position into the in-focus position. The focal correction amount used at this time can be calculated in the same manner as the first embodiment by use of a reference table. Furthermore, when revising the focal correction amount, it is preferred that the revision amount is within the depth of focus. The revision amount can be calculated using a calculation formula with reference to information such as the diaphragm value, the focus lens position, the zoom lens position and the like, or by use of the reference table. The correction amount can be varied with reference to the level or degree of the decolorization for the following reason.

In conventional focal correction, coloring that is not originally present appears as a result of a chromatic aberration in the edge portions of the subject image. Therefore, as the degree of decolorization processing intensifies, the coloring of the edge portions is relaxed. As a result, processing is performed so that the focal revision amount decreases as the degree of the decolorization processing increases (near to an achromatic state), and conversely, the focal revision amount increases as the degree of the decolorization processing decreases (a higher chroma state). As a result, when decolorization processing is performed, a more focused image signal can be acquired since the focus lens position is closer to the in-focus position than the configuration in the first embodiment.

The focal correction calculation unit 313 acquires information exhibiting the degree of decolorization processing from the color adjustment unit 314 and revises the focal correction amount thereby to output to the focal adjustment unit 311. The focal adjustment unit 311 sets the focus lens position and controls the driving of the lens group 301 through the lens control unit 312 based on the focal correction and the correction amount that is subjected to focal revision to thereby suppress coloring.

Figure 4:
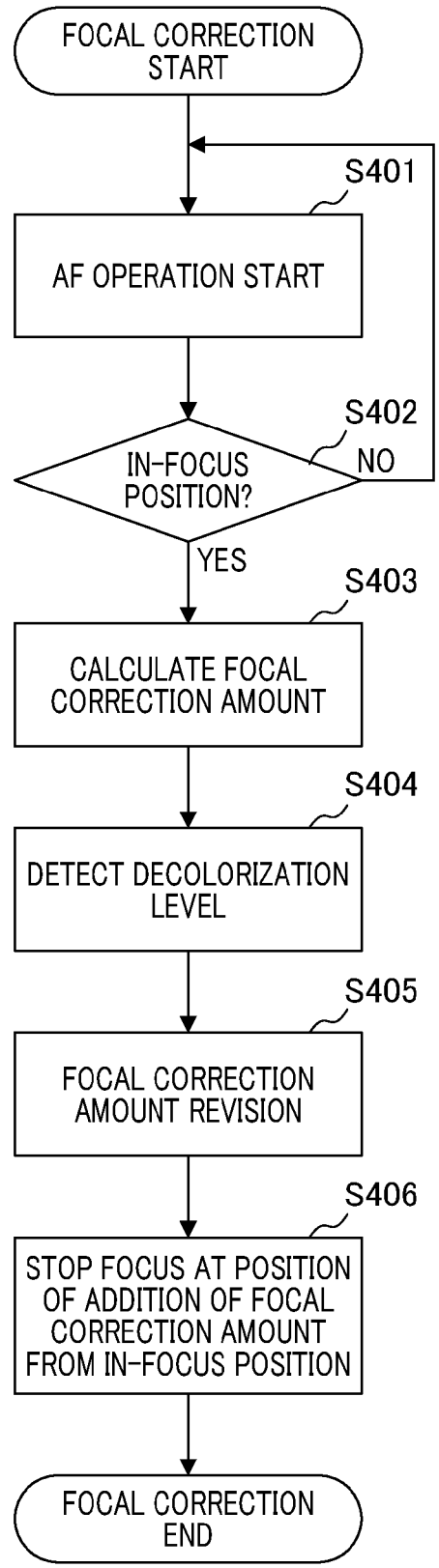
FIG. 4 is a flowchart illustrating a processing example according to the second embodiment.

Next, the focal correction process according to the present embodiment will be described in detail with reference to the flowchart in FIG. 4. The processing in steps S401 to S403 is the same as the processing in S201 to S203 in FIG. 2 and therefore the processing in S404 will be described.

The focal correction calculation unit 313 in S404 determines the decolorization level. The decolorization level expresses the degree of decolorization processing, and is varied in response to the brightness or the like of the subject. As the decolorization level increases, the color approaches an achromatic configuration is approached. The decolorization level can be detected by acquiring the information from the color adjustment unit 314. In S405, the focal correction amount is further revised. The point of difference from the processing performed in S204 in FIG. 2 is that the focal revision amount is varied in response to the decolorization level. That is to say, the focal revision amount is set to decrease as the decolorization level increases, and conversely, to increase as the decolorization level decreases. The focus lens position is set based on the focal correction amount obtained by this revision, that is to say, based on the correction amount after the focal correction and focal revision to suppress coloring (refer to S406).

According to the second embodiment, in addition to the effect of the first embodiment, a more focused image can be acquired when the degree of the decolorization processing increases.

Third Embodiment

Figure 5:
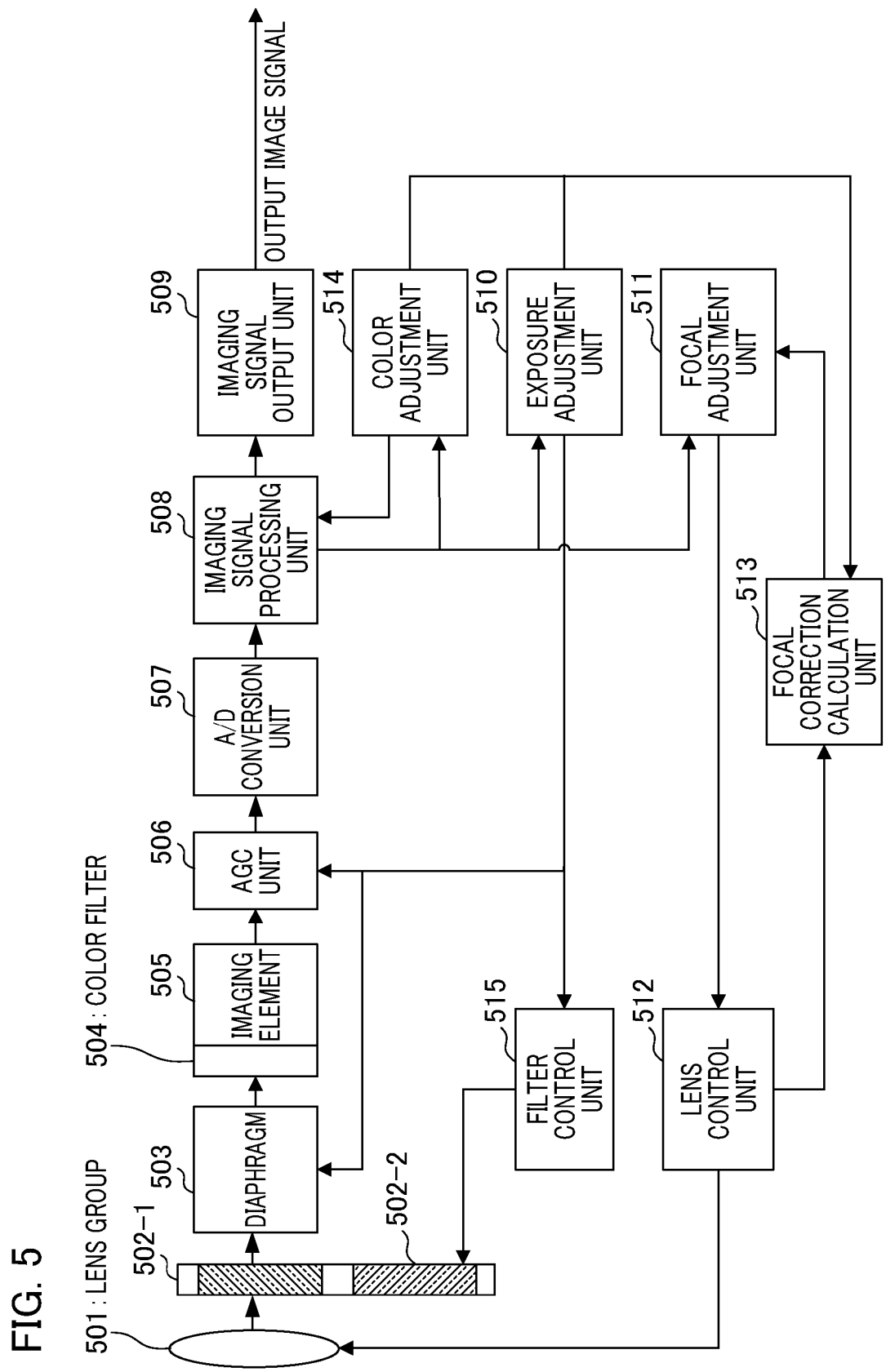
FIG. 5 is a block diagram illustrating a configuration example of an imaging apparatus according to a third embodiment.

Next, making reference to FIG. 5, an imaging apparatus will be described with reference to a third embodiment of the present invention. Those constituent elements that are the same as the second embodiment illustrated in FIG. 3 are denoted by use of reference numerals configured by addition of 200 to those reference numerals used in the second embodiment, and detailed description of those elements will not be repeated. The principal points of difference will be described below.

The imaging apparatus illustrated in FIG. 5 disposes an IR cut filter (hereinafter referred to as IRCF) 502-1 and a dummy glass 502-2 as a plurality of optical filters that are selectively used. The dummy glass 502-2 is an optical filter to maintain the optical path length, and when a change in the optical path length is allowable, the disposition of an optical filter such as a dummy glass or the like may be omitted. The IRCF 502-1 cuts wavelength components in infrared regions in order to prevent infrared light from becoming incident on the imaging element 505. In this manner, the infrared light that cannot be detected by the human eye is prevented from applying a red color to the color image due to incidence on the imaging element 505.

The exposure adjustment unit 510 controls the diaphragm 503 and the AGC unit 506, and determines the brightness of the captured image by comparison with a threshold value. When the image is determined to be dark, the exposure adjustment unit 510 sends a control signal to a filter control unit 515 and performs driving control to insert the dummy glass 502-2 into the optical axis. When the image is determined to be bright, the exposure adjustment unit 510 sends a control signal to a filter control unit 515 and performs driving control to insert the IRCF 502-1 into the optical axis. In the following description, a first imaging mode that outputs the color image in a configuration in which the IRCF 502-1 is disposed on the optical axis is termed a day mode. Furthermore in substitution for the IRCF, a second imaging mode that outputs the monochrome image in a configuration in which the dummy glass 502-2 is disposed on the optical axis is termed a night mode. In the day mode in which the color image is outputted, since the IRCF 502-1 is disposed on the optical axis, it is possible to prevent infrared components that cannot be detected by the human eye from becoming incident upon the imaging element 505 and the image from becoming colored red. In the night mode in which a monochrome image is outputted, when the subject illuminance is low, the IRCF 502-1 removed from the optical path to increase the received light amount at the expense of the coloring. In this manner, the received light sensitivity of the imaging elements 505 is increased and the problem of coloring can be solved by output of the monochrome image.

In the present embodiment, decolorization processing is performed so that a color image is outputted when the day mode is selected, and a monochrome image is outputted when the night mode is selected. The focal correction calculation unit 513 performs revision processing of the focal correction amount. When the day mode and the night mode are varied in conjunction with the inclusion or exclusion of the IRCF 502-1, the focal revision amount is varied in response to the imaging mode. During conventional focusing correction, although coloring that is not originally present appears on the edge portions of the subject image as a result of chromatic aberration, the coloring on the edge portions becomes less distinctive in the monochromatic image that is subjected to decolorization processing. Therefore, during night mode, that is to say, when the dummy glass 502-2 is disposed on the optical path and a monochromatic image is outputted, the focal correction calculation unit 513 decreases the focal revision amount in comparison to day mode or does not execute focal revision. During day mode, that is to say, when the IRCF 502-1 is disposed on the optical path and a color image is outputted, the focal correction calculation unit 513 increases the focal revision amount in comparison to night mode. In relation to a monochromatic image during night mode in which the decolorization processing is performed, since no consideration is required with respect to coloring of the edge portions resulting from chromatic aberration, less revision of the focal correction amount is performed in comparison to day mode, or focal revision is not required. That is to say, the blurring of focus is prevented mainly by performance of focal correction.

Figure 6:
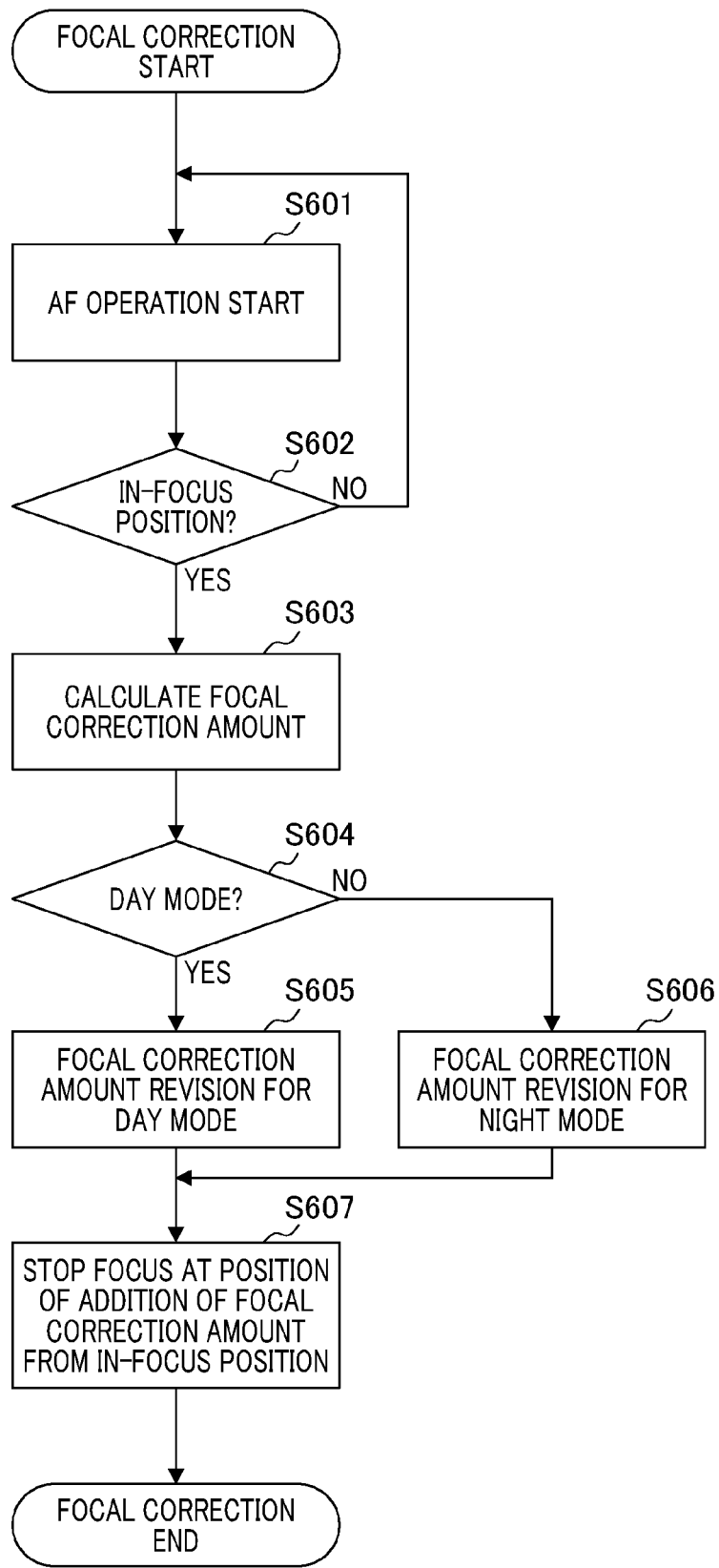
FIG. 6 is a flowchart illustrating a processing example according to the third embodiment.

The focal correction according to the present embodiment will be described in detail with reference to the flowchart in FIG. 6. The processing in step S601 to S603, and S607 is the same as the processing in S401 to S403, and S406 in FIG. 2 and therefore the processing in S604 to S606 will be described.

The exposure adjustment unit 510 in S604 determines whether the imaging mode of the camera is the day mode or the night mode. The correction amount obtained by calculation processing of the focal correction amount in S603 is further revised in response to the determination result. When the imaging mode is determined in S604 to be day mode, the processing proceeds to S605, and the focal correction calculation unit 513 performs revision of the focal correction amount for day mode. The revision of the focal correction amount in S605 is preferably revised within the focal depth so that the blurring of the focus is not evident to the eye of the user. When the imaging mode is determined in S604 to be night mode, the processing proceeds to S606, and the focal correction calculation unit 513 performs revision of the focal correction amount for night mode. In the revision of the focal correction amount in S606, the revision amount is small in comparison to day mode, or focal revision is not performed. The revision amount in S605 and S606 is calculated using a calculation formula based on information such as the position of the zoom lens, the position of the focus lens or the diaphragm value, or may be obtained by use of a reference table prepared in advance. Alternatively, a correction table is prepared by addition of the assumed focal revision amount to thereby calculate a correction amount from the table. The processing then proceeds to S607 after the steps S605 and S606, and a focus lens position is set based on the focal correction amount after revision.

In the third embodiment, in-focus correction is adapted to application of a day mode and a night mode.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-018535 filed Jan. 31, 2012, which is hereby incorporated by reference herein in its entirety.

What is claimed is:

1. An imaging apparatus that includes an optical imaging system that has a moveable lens for focus adjustment and a moveable lens for adjustment of angle of view, the imaging apparatus executing focus adjustment by displacing the moveable lens for focus adjustment to an in-focus position, the imaging apparatus comprising:
   an imaging element configured to perform photoelectric conversion upon reception of light from a subject;
   a control unit configured to control driving of the moveable lens for focus adjustment by detecting the in-focus position;
   a color adjustment unit configured to adjust a color of a captured image; and
   a correcting unit configured to acquire positional information for the moveable lens for focus adjustment or the positional information for the moveable lens for adjustment of angle of view and calculate a correction amount to correct a deviation in the in-focus position resulting from chromatic aberration in the optical imaging system, and perform processing to suppress coloring of the subject image resulting from chromatic aberration by revising the correction amount to thereby output a revised correction amount to the control unit,
   wherein the correction unit decreases a level of revision on the correction amount as the degree of a decolorization process performed by the color adjustment unit increases.

2. The imaging apparatus according to claim 1, further comprising an exposure adjustment unit configured to control a diaphragm so as to adjust a light amount on the imaging element, and wherein:
   the correction unit acquires positional information for the moveable lens and positional information for the diaphragm and calculates and revises the correction amount.

3. The imaging apparatus according to claim 1, wherein the control unit detects the in-focus position by acquiring focus adjustment information from a signal output by the imaging element, and
   the correction unit revises within the depth of field when performing a process to revise the correction amount and suppress the coloring of the subject image due to chromatic aberration.

4. The imaging apparatus according to claim 1, comprising:
   a plurality of selectively disposed optical filters; and
   a filter control unit configured to switch the plurality of optical filters in response to the imaging mode and perform control to dispose the filter on the optical axis of the optical imaging system.

5. An imaging apparatus that includes an optical imaging system that has a moveable lens for focus adjustment and a moveable lens for adjustment of angle of view, the imaging apparatus executing focus adjustment by displacing the moveable lens for focus adjustment to an in-focus position, the imaging apparatus comprising:
   an imaging element configured to perform photoelectric conversion upon reception of light from a subject;
   a control unit configured to control driving of the moveable lens for focus adjustment by detecting the in-focus position; and
   a correction unit configured to acquire positional information for the moveable lens for focus adjustment or the positional information for the moveable lens for adjustment of angle of view and calculate a correction amount to correct a deviation in the in-focus position resulting from chromatic aberration in the optical imaging system, and perform processing to suppress coloring of the subject image resulting from chromatic aberration by revising the correction amount to thereby output a revised correction amount to the control unit,
   wherein the correction unit decreases a level of revision on the correction amount when an imaging mode is selected that outputs a monochrome image in comparison to selection of an imaging mode that outputs a color image.

6. The imaging apparatus according to claim 5, further comprising an exposure adjustment unit configured to control a diaphragm so as to adjust a light amount on the imaging element, and wherein:
   the correction unit acquires positional information for the moveable lens and positional information for the diaphragm and calculates and revises the correction amount.

7. The imaging apparatus according to claim 5, wherein the control unit detects the in-focus position by acquiring focus adjustment information from a signal output by the imaging element, and
   the correction unit revises within the depth of field when performing a process to revise the correction amount and suppress the coloring of the subject image due to chromatic aberration.

8. The imaging apparatus according to claim 5, comprising:
   a plurality of selectively disposed optical filters; and
   a filter control unit configured to switch the plurality of optical filters in response to the imaging mode and perform control to dispose the filter on the optical axis of the optical imaging system.

9. A control method for an imaging apparatus that includes an optical imaging system that has a moveable lens for focus adjustment and a moveable lens for adjustment of angle of view, the imaging apparatus executing focus adjustment by displacement of the moveable lens for focus adjustment to an in-focus position, the method comprising:
   performing photoelectric conversion upon reception of light by an imaging element from the subject;
   controlling driving of the moveable lens for focus adjustment by the focus adjustment control unit by detection of the in-focus position;
   adjusting a color of a captured image; and
   the controlling further comprising:
   acquiring positional information for the moveable lens for focus adjustment or the positional information for the moveable lens for adjustment of angle of view and calculating a correction amount configured to correct a deviation in the in-focus position resulting from chromatic aberration in the optical imaging system, and performing processing to suppress coloring of the subject image resulting from chromatic aberration by revising the correction amount to thereby output a revised correction amount to the focus adjustment control unit, wherein a level of revision on the correction amount is decreased as the degree of a decolorization process performed increases, in the adjusting the color.

10. A control method for an imaging apparatus that includes an optical imaging system that has a moveable lens for focus adjustment and a moveable lens for adjustment of angle of view, the imaging apparatus executing focus adjustment by displacement of the moveable lens for focus adjustment to an in-focus position, the method comprising:

performing photoelectric conversion upon reception of light by an imaging element from the subject;

controlling driving of the moveable lens for focus adjustment by the focus adjustment control unit by detection of the in-focus position; and the controlling further comprising:

acquiring positional information for the moveable lens for focus adjustment or the positional information for the moveable lens for adjustment of angle of view and calculating a correction amount configured to correct a deviation in the in-focus position resulting from chromatic aberration in the optical imaging system, and performing processing to suppress coloring of the subject image resulting from chromatic aberration by revising the correction amount to thereby output a revised correction amount to the focus adjustment control unit, wherein a level of revision on the correction amount is decreased when an imaging mode is selected that outputs a monochrome image in comparison to selection of an imaging mode that outputs a color image.

11. An imaging apparatus that includes an optical imaging system that has a moveable lens for focus adjustment and a moveable lens for adjustment of angle of view, the imaging apparatus executing focus adjustment by displacing the moveable lens for focus adjustment to an in-focus position, the imaging apparatus comprising:

an imaging element configured to perform photoelectric conversion upon reception of light from a subject;

a control unit configured to control driving of the moveable lens for focus adjustment by detecting the in-focus position;

a color adjustment unit configured to adjust a color of a captured image; and a correction unit configured to acquire positional information for the moveable lens for focus adjustment or the positional information for the moveable lens for adjustment of angle of view and calculate a correction amount to correct a deviation in the in-focus position resulting from chromatic aberration in the optical imaging system, and perform processing to suppress coloring of the subject image resulting from chromatic aberration by revising the correction amount to thereby output a revised correction amount to the control unit, wherein the correction unit is configured to perform less revision of the correction amount in a case that a decolorization process is performed by the color adjustment unit.

12. The imaging apparatus according to claim 11, wherein the correction unit decreases a level of revision on the correction amount as a degree of the decolorization process performed by the color adjustment unit increases.

13. An imaging apparatus that includes an optical imaging system that has a moveable lens for focus adjustment and a moveable lens for adjustment of angle of view, the imaging apparatus executing focus adjustment by displacing the moveable lens for focus adjustment to an in-focus position, the imaging apparatus comprising:

an imaging element configured to perform photoelectric conversion upon reception of light from a subject;

a control unit configured to control driving of the moveable lens for focus adjustment by detecting the in-focus position; and a correction unit configured to acquire positional information for the moveable lens for focus adjustment or the positional information for the moveable lens for adjustment of angle of view and calculate a correction amount to correct a deviation in the in-focus position resulting from chromatic aberration in the optical imaging system, and perform processing to suppress coloring of the subject image resulting from chromatic aberration by revising the correction amount to thereby output a revised correction amount to the control unit, wherein the correction unit is configured to perform less revision of the correction amount in a case that an imaging mode is selected that outputs a monochrome image.

14. The imaging apparatus according to claim 13, wherein the correction unit decreases a level of revision on the correction amount when the imaging mode is selected that outputs the monochrome image in comparison to selection of an imaging mode that outputs a color image.

15. A control method for an imaging apparatus that includes an optical imaging system that has a moveable lens for focus adjustment and a moveable lens for adjustment of angle of view, the imaging apparatus executing focus adjustment by displacement of the moveable lens for focus adjustment to an in-focus position, the method comprising:

performing photoelectric conversion upon reception of light by an imaging element from the subject;

controlling driving of the moveable lens for focus adjustment by the focus adjustment control unit by detection of the in-focus position;

adjusting a color of a captured image; and the controlling further comprising:

acquiring positional information for the moveable lens for focus adjustment or the positional information for the moveable lens for adjustment of angle of view and calculating a correction amount configured to correct a deviation in the in-focus position resulting from chromatic aberration in the optical imaging system, and performing processing to suppress coloring of the subject image resulting from chromatic aberration by revising the correction amount to thereby output a revised correction amount to the focus adjustment control unit, wherein the correction amount is less revised in a case that a decolorization process is performed in the adjusting the color.

16. A control method for an imaging apparatus that includes an optical imaging system that has a moveable lens for focus adjustment and a moveable lens for adjustment of angle of view, the imaging apparatus executing focus adjustment by displacement of the moveable lens for focus adjustment to an in-focus position, the method comprising:

performing photoelectric conversion upon reception of light by an imaging element from the subject;

controlling driving of the moveable lens for focus adjustment by the focus adjustment control unit by detection of the in-focus position; and the controlling further comprising:

acquiring positional information for the moveable lens for focus adjustment or the positional information for the moveable lens for adjustment of angle of view and calculating a correction amount configured to correct a deviation in the in-focus position resulting from chromatic aberration in the optical imaging system, and performing processing to suppress coloring of the subject image resulting from chromatic aberration by revising the correction amount to thereby output a revised correction amount to the focus adjustment control unit, wherein the correction amount is less revised in a case that an imaging mode is selected that outputs a monochrome image.

* * * * *